United States Patent [19]

Minnick et al.

[11] Patent Number: 5,428,086
[45] Date of Patent: Jun. 27, 1995

[54] POLY(1,4-CYCLOHEXYLENEDIMETHYLENE TEREPHTHALATE) WITH IMPROVED MELT STABILITY

[75] Inventors: Larry A. Minnick, Bluff City; Robert W. Seymour, Kingsport, both of Tenn.

[73] Assignee: Eastman Chemical Company, Kingsport, Tenn.

[21] Appl. No.: 55,398

[22] Filed: May 3, 1993

Related U.S. Application Data

[63] Continuation of Ser. No. 426,604, Oct. 23, 1989.

[51] Int. Cl.$^6$ ................................................. C08K 5/53
[52] U.S. Cl. ..................................... 524/126; 524/128; 523/451
[58] Field of Search ................... 523/451; 524/126, 128

[56] References Cited

U.S. PATENT DOCUMENTS

| | | | |
|---|---|---|---|
| 3,356,646 | 12/1967 | Wynstra et al. | 260/47 |
| 3,368,995 | 2/1968 | Furukawa et al. | 260/40 |
| 3,547,873 | 12/1970 | Weissermel et al. | 525/438 |
| 3,814,725 | 6/1974 | Zimmerman et al. | 260/40 R |
| 4,271,274 | 6/1981 | Schmidt et al. | 525/111 |
| 4,302,382 | 11/1981 | Spanswick | 260/45.8 |
| 4,533,679 | 8/1985 | Rawlings | 523/204 |
| 4,732,921 | 3/1988 | Hochberg et al. | 523/460 |
| 4,914,156 | 4/1990 | Howe | 525/166 |

FOREIGN PATENT DOCUMENTS

| | | |
|---|---|---|
| 0273149 | 7/1988 | European Pat. Off. |
| 1111012 | 4/1968 | United Kingdom |
| 1422278 | 1/1976 | United Kingdom |

*Primary Examiner*—Paul R. Michl
*Assistant Examiner*—Edward Cain
*Attorney, Agent, or Firm*—John F. Stevens; Harry J. Gwinnell

[57] ABSTRACT

Disclosed are reinforced polyester compositions having repeat units from terephthalic acid and 1,4-cyclohexanedimethanol which have improved melt stability due to the addition of small amounts of an epoxy compound and either a phosphite or phosphonite.

1 Claim, No Drawings

POLY(1,4-CYCLOHEXYLENEDIMETHYLENE TEREPHTHALATE) WITH IMPROVED MELT STABILITY

This is a continuation of applicaiton Ser. No. 07/426,604 filed on Oct. 23, 1989, now abandoned.

TECHNICAL FIELD

This invention relates to poly(1,4-cyclohexylenedimethylene terephthalate) containing additives which improve molecular weight retention without branching after exposure to melt temperatures. The additives are (a) an epoxy compound and (b) a phosphite or phosphonite wherein at least one of the P-O bonds is attached to an aryl radical. The compositions are useful in injection molding, particularly of glass fiber reinforced and flame retarded products for the electrical and electronics industry.

BACKGROUND OF THE INVENTION

Thermoplastic polyesters, such as poly(ethylene terephthalate) [PET], poly(butylene terephthalate) [PBT], and poly(1,4-cyclohexylenedimethylene terephthalate) [PCT] are useful as injection molding compounds for a variety of applications. In general these materials are reinforced with glass fiber or mineral fillers to enhance properties. Applications include automotive parts, appliance parts, and electrical-electronics parts. The reinforced thermoplastic polyesters have useful combinations of strength, heat resistance and chemical resistance for these uses. In many cases it is required that the material also be flame-retarded, and thermoplastic polyesters can be successfully flame retarded through the use of a number of known flame-retarding additives.

Many times the thermoplastic polyester is processed into the final article of interest by injection molding. In the injection molding process, a quantity of material is melted but only a portion of it is injected into the mold. It is possible that material will remain in the melt in the molding machine for several minutes (perhaps fifteen minutes) before it is injected and cooled. For this reason, it is desirable for the polymer to have excellent stability so that it will maintain high molecular weight even after several minutes holding time at melt temperatures. Maintaining high molecular weight (or I.V.) is important in maintaining mechanical properties such as tensile, impact and flexural strengths.

This problem of melt stability is especially significant for PCT because of its higher melting temperature (290° C. vs 250° C. for PET and 225° C. for PBT). The higher melting temperature means that the polymer must be processed at a higher temperature, which accelerates the degradation rate.

One method to maintain the molecular weight at melt temperatures is to compound reactive additives into the formulation. Useful known additives of this type are multifunctional epoxy compounds and oligomers or polymers produced from them. These additives help maintain molecular weight by reacting with polyester chain ends. Because the additives are multifunctional, however, they will also result in chain branching. Thus an initially linear thermoplastic polyester, after stabilization with the multifunctional additive and exposure to melt conditions, will be branched. This is an undesirable result because it leads to changing flow characteristics and irreproducible processing and mechanical properties.

Branching can be controlled by the use of phosphorous-based stabilizers in conjunction with the reactive epoxy compounds. In some cases, however, branching is controlled at the expense of melt stability; i.e. the effectiveness of the reactive epoxy-based compound is compromised. Unexpectedly, it has been found that a certain class of phosphorous stabilizers will allow branching to be controlled without unacceptable loss of melt stability.

The use of certain epoxy compounds in PCT is disclosed in European Patent Application 0 273 149. This application also discloses the use of a phosphate compound as a component of a formulation. Phosphates are not within the scope of the present invention. The use of phenoxy resin, an epoxy-based polymer, in PET and other thermoplastic polyesters is known by others.

DESCRIPTION OF THE INVENTION

According to the present invention there is provided a polyester molding composition with improved stability in the melt comprising
 a) a polyester containing repeating units from terephthalic acid and 1,4-cyclohexanedimethanol and having an inherent viscosity from about 0.5 to 1.0,
 b) about 0.1–5%, preferably 0.5–1%, by weight of the total composition of a multifunctional epoxy-based or epoxy-derived compound,
 c) about 0.1–1.0%, preferably 0.25–0.5%, by weight of the total composition of an organic phosphite or phosphonite wherein at least one of the P-O bonds is attached to an aryl radical.

In a preferred embodiment of the present invention there is provided a reinforced molding composition with improved stability in the melt comprising
 a) a polyester having repeating units from a dicarboxylic acid component and a glycol component, at least 90 mol % of said acid component being terephthalic acid and at least 90 mol % of said glycol component being 1,4-cyclohexanedimethanol, said polyester having an inherent viscosity from about 0.5 to about 1.0,
 b) about 10–50% by weight of the total composition of a reinforcing material comprising glass fibers,
 c) about 0.1–5% by weight of the total composition of a multifunctional epoxy compound, and
 d) about 0.1–1.0% by weight of the total composition of an organic phosphite or phosphonite wherein at least one of the P-O bonds is attached to an aryl radical.

Also in a preferred embodiment of the invention there is provided a flame-retarded, melt stable compound wherein the flame retardant additives comprise an organic bromine compound and an antimony compound.

The polyester, poly(1,4-cyclohexylenedimethylene terephthalate) contains repeat units from a dicarboxylic acid component and a glycol component. The dicarboxylic acid component, a total of 100 mol %, is at least 90 mol % terephthalic acid and the glycol component, a total of 100 mol %, is at least 90 mol % 1,4-cyclohexanedimethanol.

The dicarboxylic acid component may contain up to about 10 mol % of other conventional aromatic, aliphatic or alicyclic dicarboxylic acids such as isophthalic acid, naphthalenedicarboxylic acid, cyclohexanedicarboxylic acid, succinic acid, sebacic acid, adipic acid, glutaric acid, azelaic acid and the like.

The glycol component may contain up to about 10 mol % of other conventional aliphatic or alicyclic glycols such as diethylene glycol, triethylene glycol, ethylene glycol, propanediol, butanediol, pentanediol, hexanediol, and the like.

The polyesters useful in this invention can be prepared by conventional polycondensation processes well known in the art. For example, the polyesters can be prepared by direct condensation of terephthalic acid or ester interchange using dimethyl terephthalate. The essential components of the polyester, e.g., terephthalic acid or dimethyl terephthalate and 1,4-cyclohexanedimethanol are commercially available.

The polyesters and copolyesters described above should have an I.V. (inherent viscosity) of from about 0.5 to about 1.0, and a melting point of at least 265° C.

The epoxy compound used in the present invention is selected from 1) aromatic hydrocarbon compounds having at least 3 epoxide groups, including monomers, oligomers or polymers of up to 10 monomer units
2) polymers derived from a diepoxide monomer of the formula

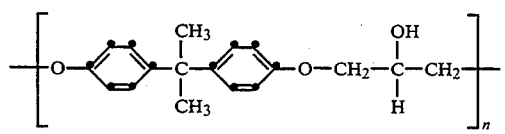

wherein n is about 50 to 200, or 3) oligomers having 2 to about 15 repeat units of diglycidyl ethers having the formula

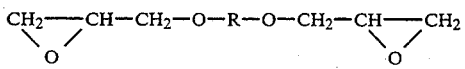

wherein R is an aromatic radical of 6–15 carbon atoms.

Preferably, the compounds of 1) above have the structural formula

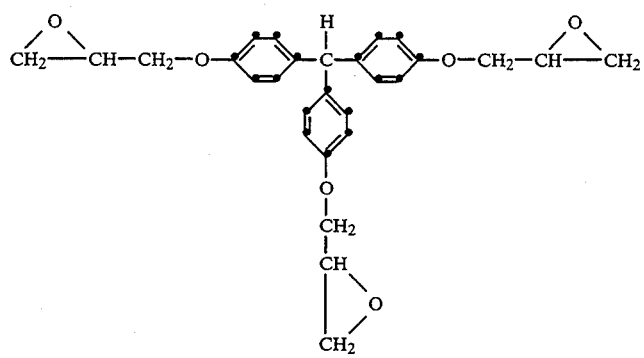

(I)

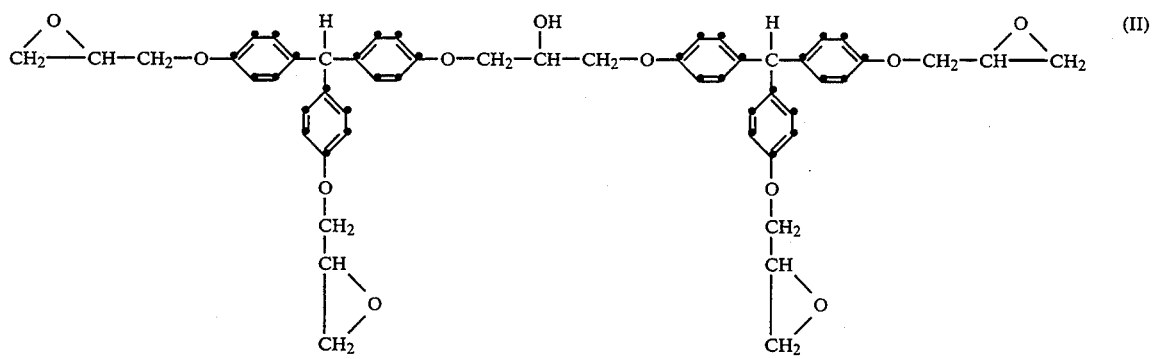

(II)

or are the reaction products of up to five moles of compound I with one mole of compound II. Commercially available compounds described in 1) include epoxylated novolac, tris(4-glycidyloxyphenyl)methane and polymers thereof, available from Dow Chemical Company.

The diepoxide monomer referred to in 2) above has the structural formula

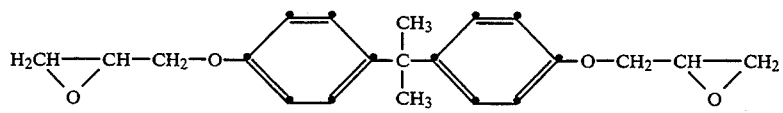

Preferably R in 3) above is

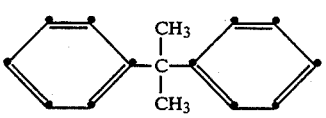

Examples of polymers described in 2) above include the polyhydroxyether of bisphenol A (commonly known as phenoxy) which is produced from 2,2'-bis(4-hydroxyphenyl) propane and epichlorohydrin. Preparation of such polymers is described in U.S. Pat. No. 3,356,646.

Commercially available compounds described in 3) include Epon oligomers of diglycidyl ether, available from Shell Chemical Company. These compounds have two reactive epoxy groups and at least one secondary hydroxyl group/per molecule.

The phosphorous-based compound is either a phosphite or a phosphonite, wherein at least one of the P-O bonds is attached to an aryl radical. Such compounds may be represented by the formulas

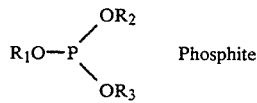 Phosphite where at least one of $R_1$, $R_2$ and $R_3$ is an aryl radical of 6 to 30 carbon atoms and any other(s) of $R_1$, $R_2$ and $R_3$ are H or alkyl of 1 to 30 carbon atoms, or

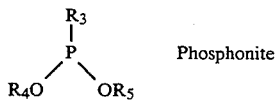 Phosphonite where at least one of $R_3$, $R_4$ and $R_5$ is an aryl radical of 6 to 30 carbon atoms and any other(s) $R_1$, $R_2$ and $R_3$ are H or alkyl of 1 to 30 carbon atoms.

Examples of such materials are Ultranox 626 phosphite, Ultranox 633 phosphite, (General Electric Chemicals), Irgafos 168 phosphite (Ciba-Geigy Corporation), Ethanox 398 phosphonite (Ethyl Corporation) and Sandostab P-EPQ phosphonite (Sandoz Chemicals).

The flame retardant comprises an aromatic organic compound having at least one aromatic ring having halogen bonded directly to the aromatic ring. The halogenated compounds are preferably brominated or chlorinated, and most preferably, brominated. The bromine content, when bromine is present, is at least 25% of the weight of the compound, and the chlorine content, when chlorine is present, is at least 40% of the weight of the compound. In addition, the flame-retardant compound should be substantially stable at up to 300° C. and should not cause degradation of polyester. When the compound contains bromine, the amount of the bromine present in the blend should preferably be between 2–12% by weight of blend, and most preferably 5–10%. When the compound contains chlorine, the amount of the chlorine present should preferably be 3–20% by weight of blend and most preferably 5–12%. Representative of such compounds are decabromodiphenyl ether, octabromodiphenyl ether, ethylene bis-(tetrabromophthalimide), brominated polystyrene, poly(dibromophenylene oxide), the condensation product of two moles of tetrachlorocyclopentadiene and one mole of cyclooctadiene, and the like. Polymeric retardants may have molecular weight up to 200,000 or more.

The flame retardant also comprises an antimony compound, for example, antimony oxide, sodium antimonate, or powdered antimony metal. The amount of antimony compound should be between 2 and 10% of the weight of the total composition, preferably between 3 and 6%.

A preferred reinforcing filler is glass fibers which may be introduced into the composition as chopped glass fibers or continuous glass fiber rovings in amounts of about 10–50% by weight of the composition. Other reinforcing materials such as metal fibers, graphite fibers, aramid fibers, glass beads, aluminum silicate, asbestos, mica, talc and the like may be used in combination with, or in place of the glass fibers.

Substantially any of the types of glass fibers generally known and/or used in the art are useful in the present invention. Typical types are those described in British Patent No. 1,111,012, U.S. Pat. No. 3,368,995 and German Auslegeschrift No. 2,042,447. Thus, the average length of useful fibers covers a wide range, for example, about 1/16 to about 2 inches. The presently preferred glass fibers have an average length of about 1/16 to about ¼ inch.

Glass filaments made of calcium-aluminum-boron silicate glass, which is relatively free from sodium carbonate, are preferably used. Glass of this type is known as "E" glass; however, where the electrical properties of the reinforced polyesters are not important, other glasses can also be used, for example the glass with a low sodium carbonate content which is known as "C" glass. The diameters of the filaments can be in the range from about 0.003 to 0.018 mm, but this is not critical for the present invention.

In addition to the components discussed hereinabove, the blends of this invention may contain additives commonly employed with polyester resins, such as colorants, mold release agents, antioxidants, tougheners, nucleating agents, crystallization aids, plasticizers, ultraviolet light and heat stabilizers and the like.

The blends of this invention are prepared by blending the components together by any convenient means to obtain an intimate blend. Compounding temperatures must be at least the melting point of the PCT. For example, the polyester can be mixed dry in any suitable blender or tumbler with the other components and the mixture melt-extruded. The extrudate can be chopped. If desired the reinforcing material can be omitted initially and added after the first melt extrusion, and the resulting mixture can then be melt extruded. The product is especially suitable as an injection molding material for producing molded articles.

EXAMPLES

The glass fiber reinforced (GFR) PCT blends of this work were prepared by extrusion compounding using a 1.5 inch Sterling single screw extruder (L/D=36/1) at temperatures of 300° C. The resulting pellets were injection molded into tensile and flexural bars for use in mechanical and flammability property testing. Melt stability was determined on these blends by drying a small sample of the compounded pellets in vacuum oven overnight at 80° C. The dried pellets were then loaded into a Tinius Olsen melt indexer and held for 15 minutes at 300° C. Molecular weight analysis was done on both the compounded pellets and the samples that were exposed to 300° C. melt temperatures for 15 minutes by gel permeation chromatography. The melt stability of these blends was shown by the retention of weight-average molecular weight (Mw) at 300° C. for 15 minutes (see Table 1).

Good melt stability is characterized by a loss of less than about 15% of the original Mw, after exposure for 15 minutes, the original Mw being defined as that at zero time. The degree of branching is characterized by the ratio of the weight-average molecular weight (Mw) to the number average molecular weight (Mn), Mw/Mn. This value should be less than 2.0 after the fifteen minute melt exposure. Values above 2.0 indicate that the composition is undergoing branching.

Blend A is described as follows. Percentages are by weight of the total composition. There is no phosphorus compound.

- 48% PCT polyester
- 30% Owens Corning 492AA glass fibers
- 3.75% Benzoflex S312 neopentyl glycol dibenzoate
- 0.25% Irganox 1010 stabilizer
- 12% Pyrochek 68PB bromonated polystyrene
- 5% Thermogard FR sodium antimonate
- 0.5% Polywax 1000 polyethylene (M.W.=1000)
- 0.5% Dow XD9053.01 epoxy resin (polymer of tris(4-glycidyloxyphenyl) methane Blend A, had excellent mechanical and flammability properties. This blend had good retention of Mw after 15 minutes at 300° C. but it also had undesirable branching as shown by the Mw/Mn ratio of 3.34.

Blends B, C, D, and E had the same composition as Blend A, but with 0.25% of either Ultranox 626 phosphite, Ultranox 633 phosphite, Irgafos 168 phosphite, or BHA/NPG phosphite of the formula,

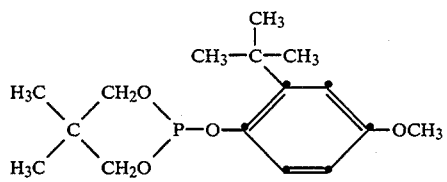

respectively. These materials were all phosphites in which at least one P-O bond was attached to an aryl radical represented by the formula given hereinbefore. These blends had excellent mechanical and flammability properties. These blends also had excellent retention of Mw after 15 minutes at 300° C. without undesirable branching as shown by Mw/Mn ratios less than 2.0.

Blends F and G had the same composition as Blend A, but with a 0.25% of Sandostab P-EPQ phosphonite and Ethanox 398 phosphonite, respectively. These materials were either phosphonites or fluorine-containing phosphonites in which at least one P-O bond was attached to an aryl radical represented by the formula given hereinbefore. These blends also had excellent mechanical and flammability properties. These blends also had excellent retention of Mw after 15 minutes at 300° C. without the undesirable branching as shown by the Mw/Mn ratios less than 2.0.

Blends H and I had the same composition as Blend A, but with 0.25% of Weston 619 phosphite and Weston TSP phosphite, respectively. These added materials were aliphatic phosphites. These blends had excellent mechanical and flammability properties, but had poor retention of Mw after 15 minutes at 300° C.

Blend J had the same composition as Blend A, but with a 0.25% of a phosphonate of the formula

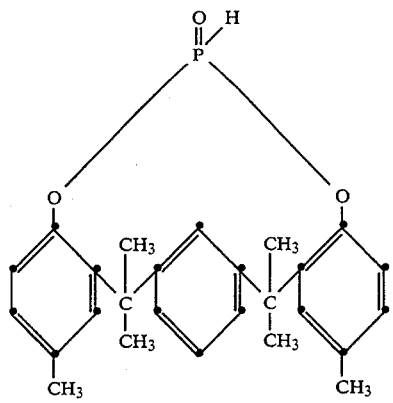

This blend had excellent mechanical and flammability properties, but had poor retention of Mw after 15 minutes at 300° C.

Blend K is described as follows. Percentages are by weight of the total composition. There is no phosphorus compound.

- 45,5% PCT polyester
- 30% glass fibers
- 3.75% Benzoflex S312 neopentyl glycol dibenzoate
- 0.25% Irganox 1010 stabilizer
- 13% Great Lakes PO-64P polydibromophenylene oxide
- 5% Thermogard FR sodium antimonate
- 0.5% Polywax 1000 polyethylene (M.W.=1000)
- 2% Phenoxy PKHH polyhydroxyether of bisphenol A Blend K had good mechanical and flammability properties. This blend had excellent retention of Mw after 15 minutes at 300° C., but had undesirable branching as shown by the Mw/Mn ratio of 2.89.

Blend L had the same composition as Blend K, but with a 0.25% of barium sodium organophosphate. This blend had good mechanical and flammability properties, but poor retention of Mw after 15 minutes at 300° C.

TABLE 1

Melt Stability at 300° C. of Flame Retarded Glass Reinforced PCT Blends

| | | Example | | | | | |
|---|---|---|---|---|---|---|---|
| | | A | B | C | D | E | F |
| Mn | 0 minutes | 24518 | 25918 | 25231 | 25615 | 26375 | 25651 |
| | 15 minutes | 18246 | 21074 | 20999 | 20984 | 20230 | 21343 |
| Mw | 0 minutes | 46097 | 43557 | 43745 | 42547 | 44658 | 43987 |
| | 15 minutes | 40867 | 40016 | 38667 | 41382 | 39178 | 41434 |
| Mw/Mn | 0 minutes | 1.88 | 1.68 | 1.73 | 1.66 | 1.69 | 1.71 |
| | 15 minutes | 3.34 | 1.90 | 1.84 | 1.98 | 1.94 | 1.94 |

| | | Example | | | | | |
|---|---|---|---|---|---|---|---|
| | | G | H | I | J | K | L |
| Mn | 0 minutes | 25868 | 25212 | 25947 | 26489 | 26176 | 26287 |
| | 15 minutes | 20503 | 17152 | 19635 | 19202 | 14758 | 17193 |
| Mw | 0 minutes | 43181 | 41344 | 43715 | 42672 | 45914 | 46289 |
| | 15 minutes | 39036 | 30980 | 36164 | 33627 | 42712 | 34876 |
| Mw/Mn | 0 minutes | 1.67 | 1.64 | 1.68 | 1.61 | 1.75 | 1.76 |

TABLE 1-continued

Melt Stability at 300° C. of Flame Retarded Glass Reinforced PCT Blends

| 15 minutes | 1.90 | 1.81 | 1.84 | 1.75 | 2.89 | 2.03 |

The above examples demonstrate that, unexpectedly, only organic phosphites and phosphonites in which at least one of the P-O bonds is attached to an aryl radical are effective in providing a useful combination of melt stability and control of branching.

Unless otherwise specified, all parts, percentages, ratios, etc., are by weight.

Molecular weights are determined in conventional manner using gel permeation chromatography.

Inherent viscosity (I.V.) is measured at 25° C. using 0.50 gram of polymer per 100 mL of a solvent consisting of 60 percent by weight phenol and 40 percent by weight tetrachloroethane.

While the invention has been described in detail with particular reference to preferred embodiments thereof, it will be understood that variations and modifications can be effected within the spirit and scope of the invention.

We claim:

1. The method of improving melt stability of a molding composition said composition comprising
   a) a polyester having repeat units from at least 90 mol % terephthalic acid and at least 90 mol % 1,4-cyclohexanedimethanol, said polyester having an I.V. of about 0.5–1.0,
   b) about 10–50% by weight of the total composition of a reinforcing material comprising glass fibers,
   c) about 0.1–5% by weight of the total composition of a multifunctional epoxy based or epoxy derived compound, said method comprising mixing with said composition about 0.1–1.0% by weight of the total composition of an organic phosphite or phosphonite wherein at least one of the P-O bonds thereof is attached to an aryl radical having 6–30 carbon atoms.

* * * * *